Dec. 24, 1929.　　　　N. F. AGNEW　　　　1,741,006
MEASURING OF TIME INTERVALS
Filed Oct. 3, 1928
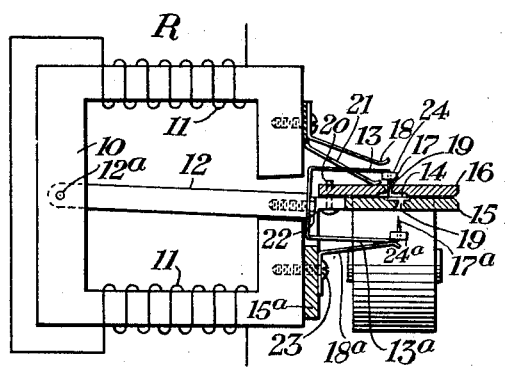
Fig. 1.
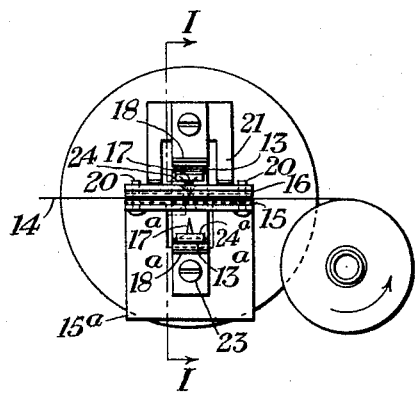
Fig. 2.
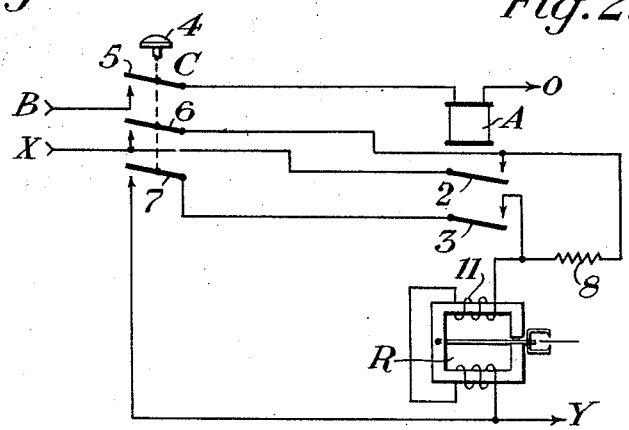
Fig. 3.
Pick-up　Release　Pick-up　Release
Fig. 4.
INVENTOR:
N. F. Agnew,
BY
His ATTORNEY Patented Dec. 24, 1929

1,741,006

UNITED STATES PATENT OFFICE

NORMAN F. AGNEW, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

MEASURING OF TIME INTERVALS

Application filed October 3, 1928. Serial No. 310,045.

My invention relates to the measurement of time intervals, and has for its object the provision of novel and improved means and methods for measuring and recording the interval of time between consecutive events, as well as a novel and improved alternating current cycle recorder for use in connection with such means and methods.

I will describe a few forms of apparatus embodying my invention, and will then point out the novel features thereof in claims.

In the accompanying drawing, Fig. 1 is a view showing in side elevation, partly sectioned on the line I—I of Fig. 2, one form of alternating current cycle recorder embodying my invention. Fig. 2 is an end view of the recorder shown in Fig. 1. Fig. 3 is a diagrammatic view showing one form of apparatus embodying my invention for measuring the time characteristics of a relay. Fig. 4 is a view showing the character of the record made by the apparatus shown in Fig. 3.

Similar reference characters refer to similar parts in each of the views.

Referring first to Figs. 1 and 2, the cycle recorder, which is designated as a whole by the reference character R, comprises a magnetizable U-shaped core 10 provided with a winding 11, and a polarized armature 12 pivotally mounted at $12^a$ and arranged to vibrate between the pole faces of the core 10. Mounted in front of the pole pieces of core 10 are two spaced plates 15 and 16 provided with non-registering apertures 19. As here shown, the lower plate 15 is provided with a vertical member $15^a$ which is attached to the core member 10 by a screw 23. A movable record strip 14, usually of paper, is located between the two plates 15 and 16, and may be drawn in the direction indicated by the arrow in Fig. 2, either by hand, or by a clockwork mechanism which is not shown and which has nothing to do with my present invention. The apertures 19 are transversely displaced with respect to the direction of movement of the record strip 14. Attached to the free end of the armature 12 are two spring arms 13 and $13^a$, the free ends of which are bent toward the record strip 14 and terminate in sharp points 17 and $17^a$ which register with the apertures 19 in the plates 15 and 16, and which points are therefore displaced transversely with respect to the direction of travel of the record strip 14. The two spring arms are preferably provided with weights 24 and $24^a$, respectively. The spring arms 13 and $13^a$ are so adjusted that when the armature is at rest in either extreme position neither one of these points engages the record strip, but that when the armature shifts from either extreme position to the other the inertia of the spring arm which then approaches the strip causes this arm to bend inwardly beyond its position of rest, with the result that the point 17 or $17^a$ on such arm punctures or makes a mark on the strip 14. Inasmuch as the points 17 and $17^a$ are transversely displaced with respect to the direction of movement of the record strip, it will be seen that if winding 11 be supplied with alternating current, the record made on the strip will consist of two lines of dots, one line being made by point 17 each time that the armature moves downwardly, and the other line being made by the point $17^a$ each time that the armature moves upwardly. The time which elapses between any two consecutive dots in either line is one full cycle of the alternating current supplied to the winding 11, while the time which elapses between any dot in one line and the next dot in the other line is one-half cycle of the alternating current.

As here shown, the two spring arms 13 and $13^a$ are formed of one continuous strip of spring material suitably bent and attached in the free end of armature 12 by a screw 22. Preferably two spring members 18 and $18^a$ are fixed to the core member 10 to engage the spring arms 13 and $13^a$, respectively, at the extreme ends of the armature stroke, for the purpose of assisting the armature in following the alternating current supplied to the operating winding 11. A third spring 21 is supported on the core member 10 and bears on the upper plate 16 for the purpose of imposing a uniform pressure no the strip 14. Guide pins 20 are fixed in plate 15 to hold plate 16 and also to aid in guiding strip 14 in its longitudinal movement between these plates.

It will be obvious from the foregoing that when alternating current of a known frequency is supplied to the operating winding 11, and when the supply of this current is initiated coincidentally with the occurence with one event and is discontinued coincidentally with a second event, the interval of time elapsing between the two events may be measured by counting the number of dots made on the record strip 14 by the points 17 and 17ª.

One important feature of a recorder embodying my invention is the fact that the punches which make the record are controlled in part by the inertia of the spring arms 13, 13ª and the weights 24, 24ª; this feature is made possible because the recorder requires merely the making of marks on the record strip as distinguished from complete perforations. Due to the light weight of the moving parts, and the inertia control of the punching members, the recorder has an advantage over telegraph recorders of the usual type in that it can be used with currents of relatively high frequencies, such as 100 or 150 cycles per second.

Another advantage of my recorder over the usual type having a magnet with an escapement and train of gears driving a clock pointer, is that such recorders are more subject to error, and leave no record in case the escapement fails to correctly register the total number of cycles. In my device the absence of an intermediate dot does not constitute an error, and if the record strip is drawn out at a fairly uniform rate it is self evident that a uniformly marked record is an accurate record. The accuracy of the time measurement with either kind of device is limited to one-half cycle, and hence the use of a relatively high frequency is desirable especially when relatively short intervals are to be measured. Since recorders of the usual types are more likely to fail at high frequencies than at low ones, and since my device is reliable at high frequencies, the principle advantage of my device over the usual recorders is apparent.

Furthermore, recorders embodying my invention have the advantages of portability, low cost of manufacture, convenience, speed, and low cost of operation. The result is that they can be used for many purposes for which an oscillograph would be awkward, inconvenient, and too expensive.

Referring now to Fig. 3, the reference character A designates a relay, the time characteristics of which are to be recorded. By time characteristics I mean the time required for the front contacts of the relay to close after current is supplied to the operating winding of the relay, and the time required for these contacts to open after the supply of current to the operating winding is discontinued. The reference character C designates a manually operable switch having three contacts 5, 6 and 7 connected together for simultaneous operation by a push button 4. The characteristics of the relay A are measured and recorded by a recorder R which may be constructed in accordance with Figs. 1 and 2 of the drawings.

The supply of operating current for relay A is furnished from a suitable source, the terminals of which are designated B and O, and the circuit for the operating winding of relay A includes contact 5 of switch C. The alternating current of known frequency for the recorder R is furnished from a suitable source the terminals of which are designated X and Y, and the supply of this current to the recorder is controlled by contacts 6 and 7 of the switch C as well as by front contacts 2 and 3 of relay A.

As shown in Fig. 3, all contacts of the switch C are open, the relay A is de-energized, and the recorder R is at rest. If now switch C be closed, operating current will be supplied to the relay A through contact 5, and at the same time the supply of alternating current to the recorder R will be initiated. The alternating current circuit is from terminal X, through contact 6 of switch C, a resistance 8, and the operating winding 11 of recorder R to terminal Y. The closing of contact 7 of the switch performs no function until the front contact 3 of relay A closes. When contact 3 closes, a low resistance shunt around recorder R becomes closed, which shunt includes contact 3 of relay A and contact 7 of switch C. It follows that when the front contact 3 of relay A closes, the supply of alternating current to the recorder will die down so the operation of the recorder will cease. The number of dots made by the recorder on the record strip during the interval required for the contact 3 of relay A to close, forms a record of the pick-up time of the relay, this record being similar to the one shown in Fig. 4.

When switch C is again opened, the shunt around recorder R will become opened at contact 7, and the main circuit for the recorder will also be opened at contact 6. Alternating current is supplied to the recorder, however, from terminal X through the front contact 2 of relay A, resistance 8, and recorder winding 11 to terminal Y, with the result that the operation of the recorder will be initiated coincidentally with the opening of the operating circuit for relay A. When front contact 2 of this relay opens, the supply of alternating current to the recorder winding will be immediately discontinued. It follows that the number of dots made by the recorder constitutes a record of the time required for relay A to release.

When the recorder is used for certain purposes, it is advantageous to mount two of the devices side by side, one making a continuous record of the alternating current, and the other making an interrupted record such as the record shown in Fig. 4. By this means it is possible to use the continuous record to measure the length of the interruptions or "off" periods of the interrupted record.

Although I have herein shown and described only one form of alternating current cycle recorder and one form of apparatus embodying my invention, and only one method for using such recorder, it is understood that various changes and modifications may be made therein within the scope of the appended claims without departing from the spirit and scope of my invention.

Having thus described my invention, what I claim is:

1. In combination, a relay, a manually operable switch having three contacts, a circuit for the operating winding of said relay including a source of current and the first contact of said switch, a second circuit including a source of alternating current and the second contact of said switch as well as a cycle recorder, a shunt for said second circuit around the cycle recorder and including the third contact of said switch and a front contact of said relay, and another shunt for said second circuit around the second contact of said switch and including another front contact of said relay.

2. In combination, a relay, the time characteristics of which are to be recorded, an alternating current cycle recorder, a manually operable switch having three contacts, a circuit for the operating winding of said relay including a source of current and the first contact of said switch, a circuit for said recorder including a source of alternating current and the second contact of said switch, a shunt for said recorder circuit around the recorder itself including the third contact of said switch and a front contact of said relay, and a second shunt for said recorder circuit around the second contact of said switch and including another front contact of said relay.

3. An alternating current cycle recorder comprising a magnet provided with a polarized armature, a movable record strip, and two styluses operated by said armature and located on opposite sides of said strip.

4. An alternating current cycle recorder comprising a magnet provided with a polarized armature, a movable record strip, and two punches operated by said armature and located on opposite sides of said strip and transversely displaced with respect to the direction of travel of the strip for making two transversely displaced impressions in the strip for each complete cycle of alternating current.

5. An alternating current cycle recorder comprising a magnet provided with a polarized armature, a movable record strip, two spring arms attached to said armature and terminating in sharp points bent toward said strip but displaced transversely with respect to the direction of travel of the strip, said arms being so adjusted that when the armature is at rest in either extreme position neither point engages the strip but that when the armature shifts from either extreme position to the other the inertia of the arm which approaches the strip causes it to move beyond its position of rest with the result that the point of such arm punctures the strip.

6. An alternating current cycle recorder comprising a magnet provided with a polarized armature, a movable record strip, two spring arms attached to said armature and terminating in sharp points bent toward said strip but displaced transversely with respect to the direction of travel of the strip, and two weights attached to said two spring arms, respectively, said arms being so adjusted that when the armature is at rest in either extreme position neither point engages the strip but that when the armature shifts from either extreme position to the other the inertia of the arm which approaches the strip causes it to move beyond its position of rest with the result that the point of such arm punctures the strip.

In testimony whereof I affix my signature.

NORMAN F. AGNEW.